United States Patent
Yu et al.

(10) Patent No.: US 9,096,226 B2
(45) Date of Patent: Aug. 4, 2015

(54) VEHICLE DYNAMIC CONTROLS COORDINATION SYSTEM FOR DUAL-AXLE DRIVEN ELECTRIC VEHICLES

(71) Applicant: Ford Global Technologies, LLC, Dearborn, MI (US)

(72) Inventors: Hai Yu, Canton, MI (US); Jianbo Lu, Northville, MI (US); Ryan Abraham McGee, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 2 days.

(21) Appl. No.: 14/068,690

(22) Filed: Oct. 31, 2013

(65) Prior Publication Data

US 2015/0120106 A1  Apr. 30, 2015

(51) Int. Cl.
  *B60L 9/00* (2006.01)
  *B60K 6/20* (2007.10)
  *B60W 30/02* (2012.01)
  *B60W 10/18* (2012.01)

(52) U.S. Cl.
  CPC .............. *B60W 30/02* (2013.01); *B60W 10/18* (2013.01)

(58) Field of Classification Search
  USPC ........................................ 701/22; 180/65.21
  See application file for complete search history.

(56) References Cited

U.S. PATENT DOCUMENTS

| | | | |
|---|---|---|---|
| 6,886,647 B1 * | 5/2005 | Gotta | 180/65.1 |
| 7,877,184 B2 | 1/2011 | Watanabe et al. | |
| 7,970,807 B2 | 6/2011 | Boudreau et al. | |
| 8,504,238 B2 | 8/2013 | Yu et al. | |
| 2004/0046448 A1 | 3/2004 | Brown | |
| 2006/0014608 A1 * | 1/2006 | Mitchell et al. | 477/107 |
| 2011/0144874 A1 | 6/2011 | Kirchner et al. | |
| 2011/0307129 A1 * | 12/2011 | Yu et al. | 701/22 |
| 2012/0077633 A1 * | 3/2012 | Mueller et al. | 475/5 |

* cited by examiner

Primary Examiner — Thomas G Black
Assistant Examiner — Tyler Paige
(74) Attorney, Agent, or Firm — David B. Kelley; Brooks Kushman P.C.

(57) ABSTRACT

An electric vehicle (HEV/BEV/EV) includes a dynamic traction control (DTC) system configured to perform a DTC process and an electric motor enhanced dynamic wheel torque control by brake (eDWT-B) system configured to perform an eDWT-B process. A controller selects according to a vehicle criterion a combination of the DTC and eDWT-B processes to control a vehicle operation.

16 Claims, 4 Drawing Sheets

VEHICLE DYNAMIC CONTROLS COORDINATION SYSTEM FOR DUAL-AXLE DRIVEN ELECTRIC VEHICLES

TECHNICAL FIELD

The present invention relates to dual-axle driven electric vehicle configurations.

BACKGROUND

Electric vehicle propulsion (EV/HEV/BEV) has been developed in vehicle electrification and hybridization technologies to improve drivability, fuel economy, and energy flexibility and reduce emissions. Vehicle powertrain and driveline electrification provides opportunities towards vehicle dynamic controls for active/passive vehicle stability improvement and performance expansion. Taking advantage of the fast and accurate electric motor torque control capability, the electric drive components have been proposed to be used in traction control and lateral vehicle dynamic controls with observed vehicle handling performance and stability enhancement.

SUMMARY

In an embodiment, a system is provided. The system includes a dynamic traction control (DTC) sub-system and an electric motor enhanced dynamic wheel torque control by brake (eDWT-B) sub-system. The system further includes a controller configured to operate a vehicle with a combination of the DTC and eDWT-B sub-systems.

The controller may select according to a vehicle criterion the combination of the DTC and eDWT-B sub-systems to control a vehicle operation. In this case, the controller may select the combination such that the DTC sub-system has a greater effect than the eDWT-B sub-system in controlling the vehicle operation as long as the vehicle criterion remains satisfied by the selected combination. The controller may select the combination such that the eDWT-B sub-system has a greater effect than the DTC sub-system in controlling the vehicle operation when the vehicle criterion is vehicle stability having a higher priority than vehicle drivability. The controller may select the combination such that the DTC sub-system has a greater effect than the eDWT-B sub-system in controlling the vehicle operation when the vehicle criterion is vehicle drivability having a higher priority than vehicle stability.

The combination may be one of the DTC sub-system by itself to control the vehicle operation, the eDWT-B sub-system by itself to control the vehicle operation, and the DTC and eDWT-B sub-systems in conjunction to control the vehicle operation. In the case of the combination being the DTC and eDWT-B sub-systems in conjunction to control the vehicle operation, one of the sub-systems may have a greater effect than the other one of the sub-systems in controlling the vehicle operation.

The vehicle may be a dual-axle driven electric vehicle such as a hybrid electric vehicle (HEV), battery electric vehicle (BEV), and an all-electric vehicle (EV).

In another embodiment, a method is provided. The method includes selecting according to a vehicle criterion a combination of a dynamic traction control (DTC) process and an electric motor enhanced dynamic wheel torque control by brake (eDWT-B) process to control a vehicle operation. The method further includes controlling at least one of a front axle, a rear axle, and a braking system of a vehicle in accordance with the selected combination of DTC and eDWT-B processes.

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
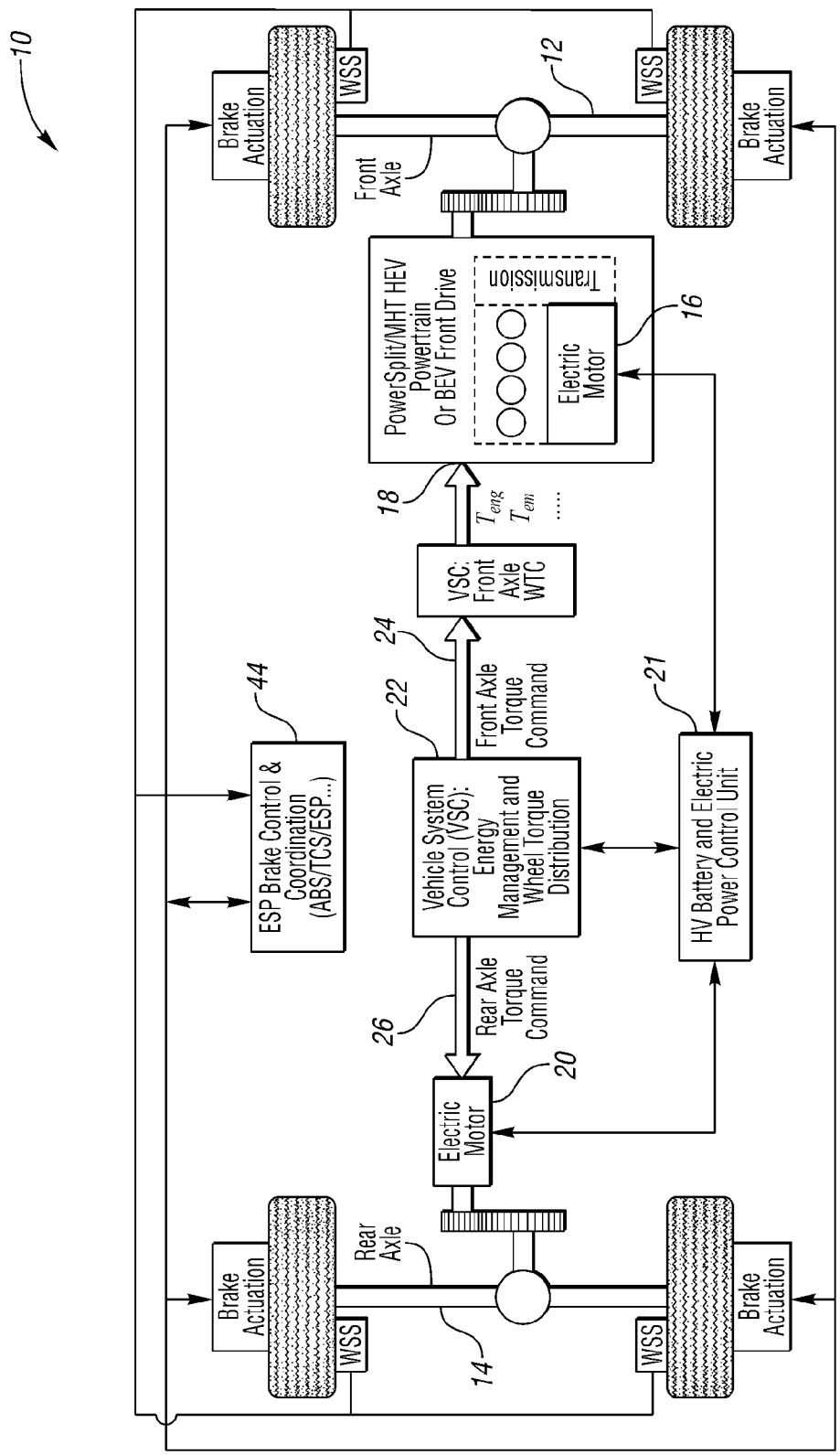
FIG. 1 illustrates a block diagram of an exemplary dual-axle driven electric vehicle configuration for use with a vehicle dynamic controls coordination system in accordance with an embodiment of the present invention.

Referring now to FIG. 1, a block diagram of an exemplary dual-axle driven electric vehicle configuration 10 for use with a vehicle dynamic controls coordination system in accordance with an embodiment of the present invention is shown. Vehicle configuration 10 includes a front axle 12 and a rear axle 14 which are independently driven, a front electric motor 16 and an engine 18 for propulsion at front axle 12, and a rear electric motor 20 for propulsion at rear axle 14. A high-voltage (HV) battery 21 provides electrical power to motors 16, 20 for the motors to use for propulsion at front and rear axles 12, 14, respectively. Vehicle configuration 10 further includes a vehicle system controller (VSC) 22. VSC 22 is configured to generate a front axle torque command 24 indicative of the drive torque to be applied to front axle 12. VSC 22 is configured to generate a rear axle torque command 26 indicative of the drive torque to be applied to rear axle 14.

A goal of an electric dual driven configuration such as vehicle configuration 10 is to realize an all-wheel drive (AWD) function in a hybrid or electric vehicle platform with optimized system operating efficiency. Such a configuration also enables power assistance from the secondary power device (i.e., motors 16, 20) to downsize the primary power device (i.e., engine 18) in a hybrid vehicle system. While satisfying vehicle drivability request from the driver, the fuel economy of the hybrid vehicle powertrain system is highly improved.

As described and shown, vehicle configuration 10 represents a hybrid electric dual driven axle system with an electric motor actuated rear driven axle 14 and a hybrid propelled front driven axle 12. Both motors 16, 20 can supply propulsion torque and regenerative braking torque to the driven axles 12, 14, respectively. Front axle 12 is assumed to be the primary driven axle that is equipped with a PowerSplit/MHT (modular hybrid powertrain) or other type of hybrid power generation system.

While ignoring the detailed mechanical linkage relationships, for simplification, the front axle torque output at the driveshaft is formulated as:

$$\tau_{fa\_dft} = \tau_{eng\_dft} + \tau_{mf},$$

where $\tau_{eng\_dft}$ is the total engine torque output at the front axle driveshaft and $\tau_{mf}$ is the front electric motor torque at the front axle driveshaft. It is assumed that the engine torque and the motor torque at the driveshaft are additive.

At the rear axle, the rear motor is the pure electric torque source that generates $\tau_{mr}$ at the rear axle driveshaft such that the rear axle torque output at the driveshaft is formulated as:

$$\tau_{ra\_dft} = \tau_{mr}.$$

A vehicle dynamic controls coordination system in accordance with an embodiment of the present invention focuses on vehicle system controls. The drivability defined for this purpose has the system requirement of:

$$\tau_{drv\_whl} = \tau_{fa\_dft} + \tau_{fa\_dft},$$

where $\tau_{drv\_whl}$ is the total wheel torque demanded primarily by the driver and supplementary modified by other active/passive safety control systems such as ACC, CMB, TRC, ABS, etc. It is assumed herein that both driven axles 12, 14 are equipped with open differentials. However, driven axles 12, 14 could be equipped with some active/passive torque vectoring devices.

When engine 18 is off, the vehicle operates in electrical vehicle (EV) mode and the single source of the propulsion power is battery 21 which provides power to propel the vehicle according to the formulation:

$$P_{batt} = P_{drv} + P_{loss},$$

where $P_{batt}$ is the battery power that discharges at a positive value and charges at a negative value, $P_{drv}$ is the equivalent drive power demand, and $P_{loss}$ is the total vehicle operation power loss which includes mechanical torque transfer loss, electrically power generation and delivery loss, and the engine power generation loss.

When engine 18 is on, both engine 18 and battery 21 concurrently provide power to propel the vehicle according to the formulation:

$$P_{eng} + P_{batt} = P_{drv} + P_{loss},$$

where $P_{eng}$ is the engine power output that supplies power at a positive value and has a negative value during engine braking In normal driving situations, Energy Management Control (EMC) and Wheel Torque Control (WTC) functions in vehicle system controller (VSC) 22 determine the engine on/off state and power split and wheel torque distribution states such that the drivability requirement is primarily satisfied with optimized system operation states which minimize the system power loss $P_{loss}$ both instantaneously and accumulatively in a driving cycle while satisfying certain battery charge sustaining or depleting constraints. As such, the highest fuel economy benefit is achieved.

In addition to the normal drivability and fuel economy oriented vehicle controls, vehicle dynamic enhancement is another control objective to be achieved for the AWD vehicle platform of vehicle configuration 10. To this end, two powertrain/driveline electrification based vehicle dynamic control technologies have been proposed for dual-driven-axle electric vehicles. The two vehicle dynamic control technologies are: (1) Dynamic Traction Control (DTC); and (2) electric motor enhanced dynamic wheel torque control by brake (eDWT-B).

The Dynamic Traction Control (DTC) vehicle dynamic control aims to maximize vehicle traction utilization and to improve vehicle maneuverability and stability preservation. A DTC system includes a traction controller that realizes AWD drive traction optimization. During vehicle acceleration or deceleration, the vehicle drive torque or regenerative brake torque request can be partitioned continuously through electrical power distribution between the front and rear axles such that the vehicle has the option of front wheel drive, rear wheel drive, and all-wheel drive patterns.

The DTC vehicle dynamic control has two control objectives. The first control objective is to achieve maximum level of drivability that can be supported by the road surface by actively partitioning wheel torque between the two driven axles. When wheels at one axle lose traction, more or the entire wheel torque request is allocated to the other driven axle to take advantage of the available friction support from the ground. Meanwhile, the drive torque request at the spinning axle is decreased to bring the instable axle/wheel back to the stable tire force/slip region through motor based regenerative braking. The recycled electric energy can be charged to the HV battery or directly transferred to the other axle to assist in propulsion. As a result, it is expected to have no drive torque reduction and minimal power loss in this traction control event. The same control and actuation scheme also applies to a vehicle braking event. That is, during braking, when one driven axle observes wheel locking tendency, the motor torque is increased to reduce the regenerative braking effect and to compensate possible engine brake effect. The reduced brake demand is appended to the other axle with increased motor regenerative braking torque to utilize available friction capacity from the ground. The increased regenerative energy at the second axle can also help to support the power increase at the first axle.

During vehicle cornering, the vehicle lateral tire force generally decreases when the same tire's longitudinal force increases while operating inside the friction circle. When conducting active wheel torque partitioning, the condition of longitudinal tire forces at different axles changes accordingly. As such, the vehicle yaw dynamic states also change. This is because the lateral force at one axle is increasing as the wheel torque request is decreased at that axle and the lateral force is decreasing at the other axle as its wheel torque request is increased. This effect helps realize the direct yaw moment control via active wheel torque distribution between the two driven axles. Thus, the second control objective of the DTC vehicle dynamic control is to adjust the vehicle yaw/roll dynamic state for vehicle dynamic steer-ability and stability enhancement without compromising vehicle drivability by taking advantage of the yaw moment adjustment obtained from the active wheel torque redistribution.

The electric motor enhanced dynamic wheel torque control by brake (eDWT-B) vehicle dynamic control achieves the same level of yaw moment control capability as that from a brake based vehicle stability control system, e.g., ESP (electronic stability program), without compromising vehicle drivability. The achievement of the stability and steer-ability enhancement is based on the generation of a pure yaw control moment through independent brake actuation and electric motor based drivability compensation. The brake torque can be applied at either wheel at one side of the vehicle in a turning event. Meanwhile, the eDWT-B requests exerting additional propulsion torque from the electrified powertrain/driveline system to compensate the traction loss and potential speed reduction introduced by the brake actuation. Thus, it results in a pure yaw control moment. For stability controls, at least one of the inside wheels can brake to generate pro-turning yaw control moment to counteract excessive under-steer tendency. At least one of the outside wheels can brake to generate counter-turning yaw control moment to counteract excessive over-steer motion. In both case, the motor traction torque is increased and the traction force is compensated at the opposite side of the wheels to balance the traction effort. Similarly, for steer-ability and comfort improvement, at least one of the inside wheels brakes to generate pro-turning yaw control moment to enhance vehicle turning agility. In a yaw disturbance rejection control application, the wheel that exerts brake effort depends on the direction of the disturbance yaw moment. The vehicle propulsion torque increases appropriately at the opposite side of the wheels to compensate the traction loss.

Besides, assuring drivability, it also helps maximizing the yaw control moment in a tire friction saturation event, which cannot be achieved by a brake based yaw control strategy. The control performances, like promptness and precision, are expected to be largely improved because of the fast response time and accurate torque control of the motors. This is an advantage because the traction variation and loss cannot be avoided without the fast and accurate inner loop motor based traction compensation control during the transient control phase of the relatively slow brake based yaw moment control loop.

As set forth from the above-described vehicle dynamic control via electrified powertrain/driveline technologies, both the DTC and eDWT-B vehicle dynamic controls are able to assist the driver in achieving a higher level of vehicle steer-ability and in retaining stability (no fishtailing or plowing) as well as improved driving comfort during vehicle dynamic handling maneuvers. It is expected that hybrid electric vehicles can provide better vehicle handling performance and stability preservation besides the improved drivability and fuel economy merits.

However, a problem is as follows. In normal electric vehicle (EV/HEV/BEV) operation, drivability is the primary requirement and fuel economy with minimized fuel consumption is the next requirement. While satisfying the driver torque demand, the wheel torque distribution among axles is determined according to an optimally determined efficient vehicle operating state. The system optimization objective is defined as:

$$J = \int_0^{T_f} \dot{m}_f(t)dt + \|e_{Tdrv}\|_1,$$

where $\dot{m}_f$ is the engine fuel flow rate, $e_{Tdrc} = \tau_{drv\_whl} - (\tau_{fa\_dft} + \tau_{ra\_dft})$, and $\tau_f$ is the time duration of a driving cycle.

When a vehicle exhibits more and more under-steer or over-steer tendency, vehicle maneuverability is compromised. Vehicle maneuverability is defined herein as a summarized vehicle performance index of path-following, steer-ability, and medium level over-steer/under-steer compensation requirements. While the vehicle drivability is still guaranteed, the fuel economy and maneuverability requirements have to be optimized together to determine the wheel torque distribution state between axles. Depending on a design specification, even though the vehicle dynamic involved wheel torque distribution optimization may potentially improve long term fuel economy, a maneuverability requirement may compromise instantaneous and short term fuel economy objectives. Furthermore, when observing excessive vehicle under-steer/over-steer tendency or severe roll dynamics, the vehicle dynamics have to be restrained to preserve vehicle yaw/roll stability. In this case, the vehicle stability requirement has the highest priority in control over the drivability, fuel economy, and maneuverability requirements.

Denote the reference yaw rate as $r_d$ the reference sideslip angle as $\beta_d$, and the yaw control moment as $m_{zc}$, and define the vehicle dynamic control state vector as $X = [q_1(r_d - r), q_2(\beta_d - \beta)]^T$, where $r$ and $\beta$ are measured or estimated vehicle yaw rate and sideslip angle respectively. Also define $Z = [X^T, R \cdot m_{zc}]^T$. The new system optimization objective in a vehicle dynamic involved control event is then:

$$J = \int_0^{T_f} \dot{m}_f(t)dt + \|e_{Tdrv}\|_1 + \|Z\|_2 \text{ or}$$

$$J = \int_0^{T_f} \dot{m}_f(t)dt + \|e_{Tdrv}\|_1 + \|Z\|_\infty$$

From the above analysis, it is desirable to design a control strategy capable of prioritizing and synchronizing different vehicle operation requirements with respect to different vehicle driving situations. When either the maneuverability requirement or the stability requirement gain priority, both the DTC and eDWT-B vehicle dynamic controls are capable of assisting yaw moment control in order to control the vehicle yaw/roll dynamic states. However, different technologies have their specific control and implementation properties and constraints. Even though their control executions are not mutually exclusive, their actuations have to be sequentially coordinated to assure satisfactory and optimized control performance.

The DTC vehicle dynamic control is a further optimization on the VSC-WTC with respect to vehicle dynamic control and fuel economy. In some situations, the fuel economy might be compromised by maneuverability, but an optimized DTC has the potential to further improve fuel economy through optimized wheel torque distribution. The actuation of DTC is subtle and continuous with no or trivial additional energy consumption towards wheel torque redistribution due to the energy recirculation capability. However, its availability and effectiveness is subjected to the following system and environmental constraints.

First, the yaw control moment is obtained indirectly from modifying tire lateral force at each axle through longitudinal traction force redistribution. The total available yaw moment for control is limited by: current torque distribution state; driver steering input; road friction condition; and vehicle pitch and roll states. Second, the wheel torque distribution capability between the front axle hybrid drive and the rear axle electric drive is further constrained by: HV battery state of charge and power limit; vehicle operating mode, mode switch transients; and powertrain operating mode and mode transitions.

On the other hand, the execution of the eDWT-B vehicle dynamic control exerts longitudinal tire force to generate yaw control moment directly using differential braking without compromising drivability (through traction compensation). The application strategy has better stability reservation, which makes it powerful in yaw moment control in comparison to DTC. The desired yaw control moment can be realized flexibly using different combinations of wheel braking torque and compensating motor torque between axles. It has a wider application range, less constraints by powertrain and electrical system states and no constraint from current torque split state. In general, its execution has guaranteed availability and effectiveness. However, the brake application in eDWT-B introduces additional power consumption, which jeopardizes the fuel economy control objective. Unless in a stability control event or when the maneuverability is valued high, the execution of eDWT-B is not in favor for the sake of fuel economy consideration.

Based on the above-analysis, it is desirable to have a control strategy that governs activation and execution of the DTC and eDWT-B vehicle dynamic controls to take advantage of their individual control characteristics while avoiding actuation constraints. With such a control strategy the vehicle stability and maneuverability requirements can be achieved with satisfactory design specification and at minimal or no compromise to fuel economy. Furthermore, such a control strategy is expected to provide the best achievable fuel economy for different driving cycles while providing satisfactory vehicle handling performance.

A vehicle dynamic controls coordination system in accordance with embodiments of the present invention operates to provide such a desired control strategy. The control strategy of the vehicle dynamic controls coordination system coordinates two vehicle electrification-based dynamic control processes (i.e., DTC and eDWT-B vehicle dynamic controls) for electric dual-driven-axle vehicles. The control strategy achieves optimized system operation and extended range of application with respect to stability and maneuverability while satisfying the vehicle drivability and fuel economy objectives.

The control strategy of the vehicle dynamic controls coordination system in accordance with embodiments of the present invention coordinates the prioritization among different vehicle operation requirements (drivability/fuel economy vs. maneuverability and stability) such that the overall vehicle operation in different driving scenarios satisfies desirable design specifications. Furthermore, the control strategy governs the control execution between the DTC and eDWT-B vehicle dynamic controls such that the overall vehicle control action assures stable vehicle behavior and satisfies specified vehicle maneuverability performance requirements.

Figure 2:
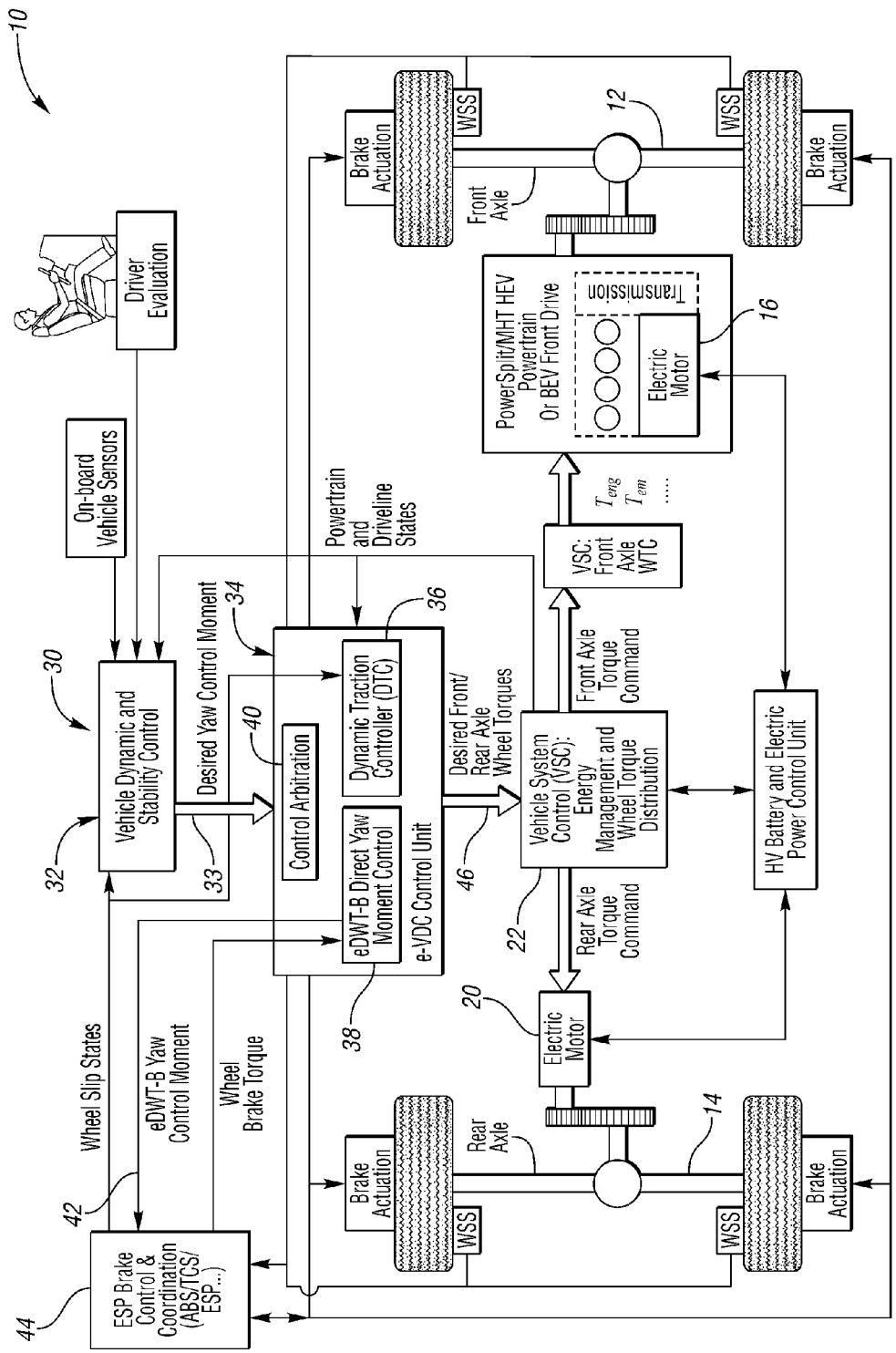
FIG. 2 illustrates a block diagram of the exemplary dual-axle driven electric vehicle configuration with a vehicle dynamic controls coordination system in accordance with an embodiment of the present invention.

Referring now to FIG. 2, a block diagram of vehicle configuration 10 with a vehicle dynamic controls coordination system 30 in accordance with an embodiment of the present invention is shown. Coordination system 30 includes at the highest strategy level a Vehicle Dynamic Control and Stability Control (VDC) module 32. VDC module 32 continuously calculates target vehicle yaw rate and sideslip angle, as well as roll state. VDC module 32 further projects these target reference signals as predictions to the future based on assumed vehicle states and external inputs. Meanwhile, VDC module 32 uses feedback control or model based predictive control methods in determining desired yaw control moment in finite prediction and control horizons into the future. This high level reference control command is sent from VDC module 32 to the lower level control modules of coordination system 30 with the control objective that the vehicle yaw, sideslip, and roll states are regulated to achieve the best maneuverability performance and optimal stability preservation when the recommended yaw moment control command 33 is executed.

Coordination system 30 further includes at a lower strategy level an e-VDC control unit 34. e-VDC control unit 34 is part of VSC 22. e-VDC control unit 32 includes a DTC vehicle dynamic control algorithm 36 and an eDWT-B vehicle dynamic control algorithm 38. As such, both the DTC and eDWT-B control algorithms reside in the function block of e-VDC control unit 34 where either an active wheel torque partitioning (i.e., the DTC dynamic vehicle control) or a networked application of brake and motor torque (i.e., the eDWT-B dynamic vehicle control) or any combination thereof (i.e., any combination of DTC and eDWT-B dynamic vehicle control) is actuated to realize the recommended yaw control moment.

The control strategy activation and selection is highly dependent on the current vehicle system control objective at different vehicle driving situations. To this end, e-VDC control unit 34 further includes an arbitration controller 40. The control arbitration function block of arbitration controller 40 is designed for e-VDC control unit 34 to administrate the control activation and strategy selection such that the vehicle maneuverability and stability are optimally managed with no or minimal compromise to the fuel consumption minimization objective. The detailed algorithm of the arbitration function of arbitration controller 40 is described in detail below.

As shown in FIG. 2, the outputs of e-VDC control unit 34 include: (i) the desired wheel brake torque command 42 that is commanded to an ABS/ESP brake module 44 of vehicle configuration 10; and (ii) the desired powertrain/driveline torque partitioning states at axles command 46, i.e., the desired front axle driveshaft torque and the desired rear axle driveshaft torque.

VSC 22 with wheel torque control (WTC) manages the states of the vehicle powertrain and electrical power unit to deliver the requested front axle and rear axle driveshaft torques according to the e-VDC torque distribution command. In normal driving situations, the VSC-WTC function determines the wheel torque distribution between axles to satisfy drivability and to optimize for system operation efficiency/fuel economy. When certain maneuverability or stability requirements are to be satisfied, the e-VDC determined wheel torque distribution exerts an additional constraint for VSC-WTC powertrain optimization. The VSC-WTC still has its freedom to optimize the powertrain and electrical system states, but it is to assure proper delivery of wheel torque at each driven axle. Such a constraint optimization may compromise the fuel economy objective. Thus, the control arbitration in e-VDC control unit 34 manages the actuation of the DTC and eDWT-B vehicle dynamic controls such that an optimal tradeoff can be achieved among maneuverability/stability and fuel economy objectives.

Figure 3:
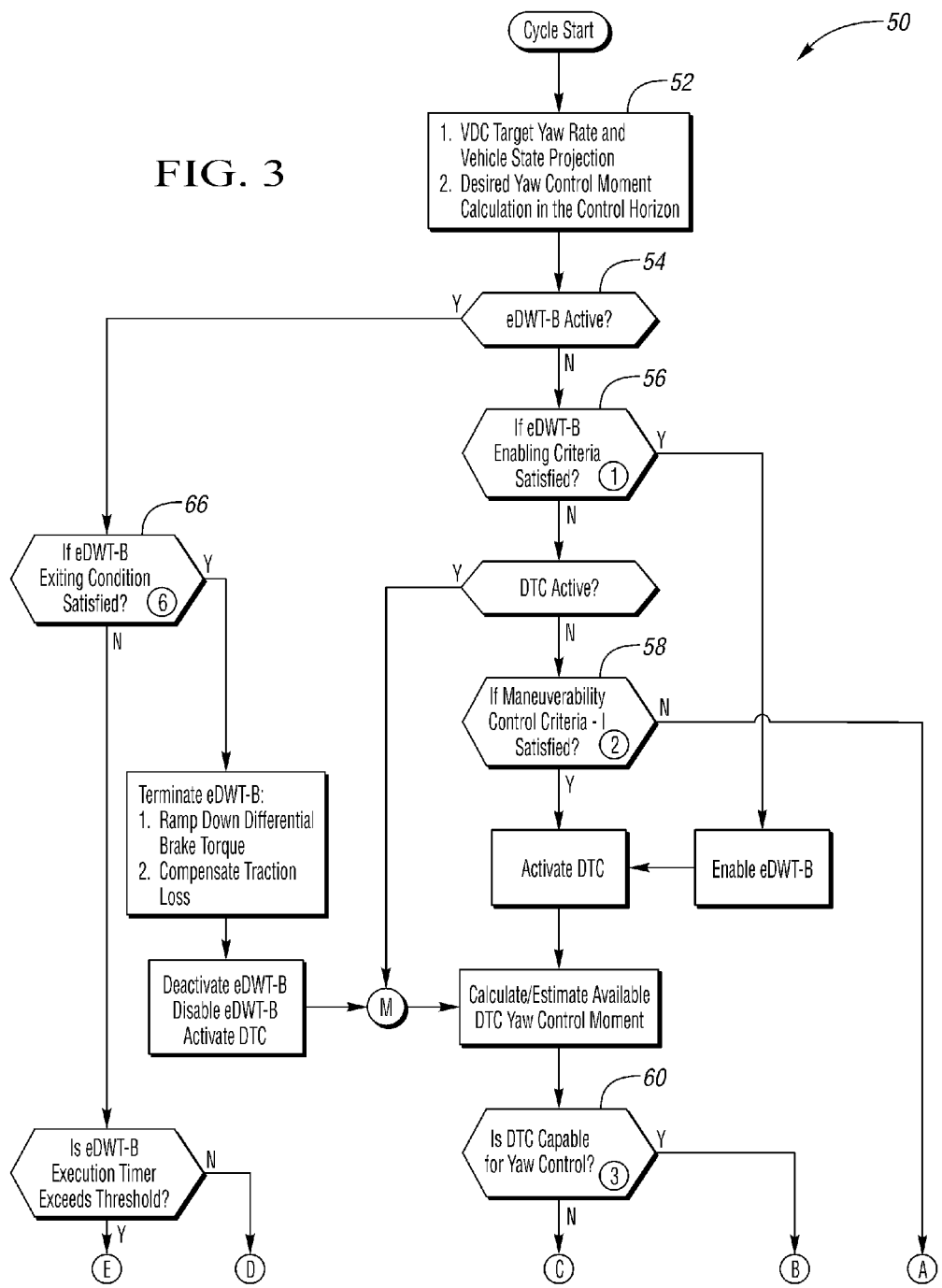
FIG. 3 illustrates a flowchart describing operation of the vehicle dynamic controls coordination system in accordance with an embodiment of the present invention.
Figure 3:
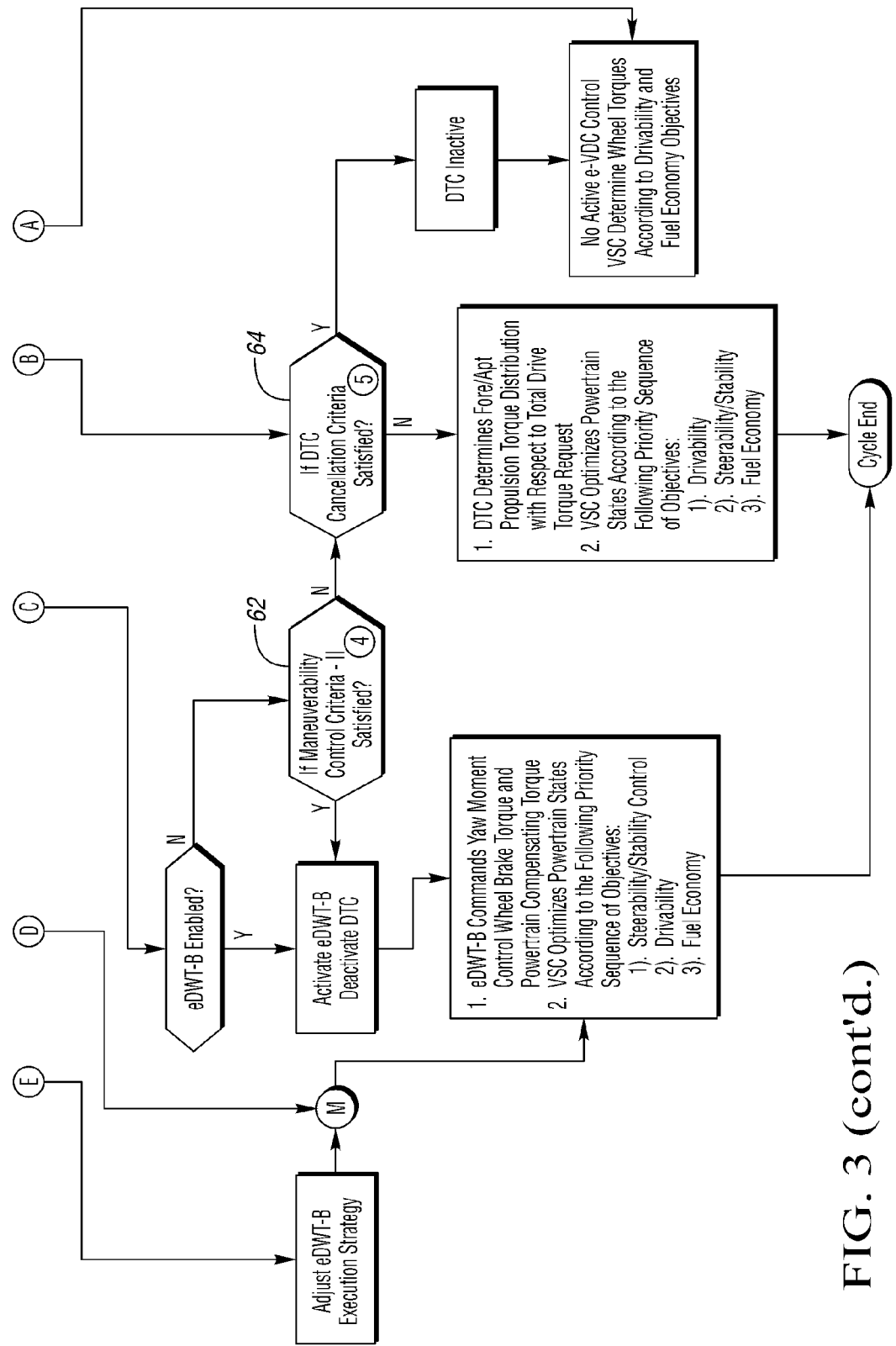

Referring now to FIG. 3, with continual reference to FIG. 2, a flowchart 50 describing operation of vehicle dynamic controls coordination system 30 including the operation of the e-VDC control arbitration logic is shown.

According to the control logic flow, VDC module 32 of coordination system 30 initially calculates and commands high level vehicle dynamic control. In particular, with reference to block 52, the desired target yaw rate and sideslip angle are both computed in a projected control horizon $h_{proj}$ and a predicted control horizon $h_{pred}$. The projected horizon is a time scale into the future in which the vehicle states are projected by assuming fixed external inputs without active e-VDC control action. The prediction horizon is a time scale into the future in which the vehicle states and the e-VDC controls are predicted using model based predictive feedback control strategy. In the following analysis, the variable z is be used to indicate future time.

The target vehicle yaw rate $r_d(\tau)$ and reference sideslip angle $\beta_d(\tau)$, for $\tau \in 0 \sim h_{proj}$, are calculated based on vehicle speed, steering angle, road friction condition, etc. They are projected into the future together with the vehicle state projection, where unavailable future information is assumed fixed to their current values. If $h_{proj}=0$, then no projection is carried out. Instead, only instantaneous reference yaw rate and sideslip angle are obtained. Meanwhile, the projected vehicle yaw rate $r(\tau)$ and sideslip angle $\beta(\tau)$ for $\tau \in 0 \sim h_{proj}$ are also calculated from the vehicle model assuming sustained vehicle states and external inputs.

VDC module 32 calculates a projected stability oriented yaw control moment from projected yaw rate error $\epsilon_r(\tau)$ and the projected sideslip angle error $\epsilon_\beta(\tau)$ as:

$$m_{sc}^{proj}(\tau) = f_{sc}^1(\epsilon_r(\tau), \epsilon_\beta(\tau), \phi_{veh}(\tau)),$$

where the subscript "sc" stands for stability control; $\tau_r(\tau) = r_d(\tau) - r(\tau)$ and $\epsilon_\beta(\tau) = \beta_d(\tau) - \beta(\tau)$ for $\tau \in 0 \sim h_{proj}$ and $\phi_{veh}(\tau)$ is the lumped vehicle states that are projected to the future.

VDC module 32 also calculates a projected stability oriented yaw control moment from a model based predictive feedback control strategy where the yaw control moment is optimized in a finite control horizon $h_{pred}$ into the future. The predicted yaw control moment is defined as:

$$m_{sc}^{pred}(\tau) = f_{sc}^2(\epsilon_r(0), \epsilon_\beta(0), \phi_{veh}(0), h_{pred}), \tau \in 0 \sim h_{pred}.$$

The associated predicted vehicle states are defined as:

$$\phi_{veh}^{sc}(\tau) = f_{sc}^3(\epsilon_r(0), \epsilon_\beta(0), \phi_{veh}(0), h_{pred}), \tau \in 0 \sim h_{pred}.$$

Similarly, VDC module 32 calculates a projected maneuverability oriented yaw control moment from projected vehicle yaw rate error and projected vehicle states as:

$$m_{mc}^{proj}(\tau) = f_{mc}^1(\epsilon_r(\tau), \phi_{veh}(\tau)), \tau \in 0 \sim h_{proj}.$$

The subscript "mc" stands for maneuverability control.

VDC module 32 calculates a predicted maneuverability oriented yaw control moment from a model based predictive feedback control strategy with optimized maneuverability yaw control moment as:

$$m_{sc}^{pred}(\tau) = f_{mc}^2(\epsilon_r(0), \phi_{veh}(0), h_{pred}), \tau \in 0 \sim h_{pred}.$$

The associated predicted vehicle states are defined as:

$$\phi_{veh}^{mc}(\tau) = f_{mc}^3(\epsilon_r(0), \phi_{veh}(0), h_{pred}), \tau \in 0 \sim h_{pred}.$$

With reference to decision block 54, the next step is to determine whether to enable the eDWT-B vehicle dynamic control to assist steer-ability or yaw stability control. The stability requirement, when present, is the highest priority requirement to be satisfied. The decision making logic follows a control condition I indicated in decision block 56 and described as follows.

Control Condition I: eDWT-B enabling condition is an AND logic of all of the following conditions:

1. $T_{sc\_hist} \geq H_{sc\_hist}$ $$T_{sc\_hist} = \begin{cases} T_{sc\_hist} + t_s, & \text{if } |m_{sc}^{proj}(0)| > M_{sc}^1 \\ 0, & \text{otherwise} \end{cases}$$

2. $|m_{sc}^{proj}(0)| > M_{sc}^1$

3. $T_{sc\_proj} \geq H_{sc\_proj}$ $$T_{sc\_proj} = \int_0^{h_{proj}} C_{sc\_ind\ 1}(\tau) d\tau, \text{ for } \tau \in 0 \sim h_{proj}$$

$$C_{sc\_ind\ 1}(\tau) = \begin{cases} w_{sc1}, & \text{if } |m_{sc}^{proj}(\tau)| > M_{sc}^2 \\ 1, & \text{if } M_{sc}^1 < |m_{sc}^{proj}(\tau)| \leq M_{sc}^2 \\ 0, & \text{otherwise} \end{cases}$$

4. $T_{sc\_pred} \geq H_{sc\_pred}$ $$T_{sc\_pred} = \int_0^{h_{pred}} C_{sc\_ind\ 2}(\tau) d\tau, \text{ for } \tau \in 0 \sim h_{pred}$$

$$C_{sc\_ind\ 2}(\tau) = \begin{cases} w_{sc2}, & \text{if } |m_{sc}^{pred}(\tau)| > M_{sc}^4 \\ 1, & \text{if } M_{sc}^3 < |m_{sc}^{pred}(\tau)| \leq M_{sc}^4 \\ 0, & \text{otherwise} \end{cases}$$

When by design either $h_{proj} = 0$ or $h_{pred} = 0$, the corresponding condition #3 or #4 of the control condition I is removed from the AND logic.

The DTC vehicle dynamic control is activated based on a first lateral maneuverability (path following and yaw/roll compensation) threshold determined from the yaw rate error and the vehicle sideslip error. The demanded fore-aft torque split ratio is obtained from an optimization with respect to both the fuel economy and the maneuverability objectives. The drivability is assured. The maneuverability requirement, when present, is subordinate to the drivability requirement. It is to be optimized together with the fuel economy requirement. With reference to decision block 58, the activation of the DTC vehicle dynamic control is determined by a control condition II as follows.

Control Condition II: Maneuverability control criteria-I is an AND logic of all of the following conditions:

1. $T_{mc\_hist} \geq H_{mc\_hist}$ $$T_{mc\_hist} = \begin{cases} T_{mc\_hist} + t_s, & \text{if } |m_{mc}^{proj}(0)| > M_{mc}^1 \\ 0, & \text{otherwise} \end{cases}$$

2. $|m_{mc}^{proj}(0)| > M_{mc}^1$

3. $T_{mc\_proj} \geq H_{mc\_proj}$ $$T_{mc\_proj} = \int_0^{h_{proj}} C_{mc\_ind\ 1}(\tau) d\tau, \text{ for } \tau \in 0 \sim h_{proj}$$

$$C_{mc\_ind\ 1}(\tau) = \begin{cases} w_{mc1}, & \text{if } |m_{mc}^{proj}(\tau)| > M_{mc}^2 \\ 1, & \text{if } M_{mc}^1 < |m_{mc}^{proj}(\tau)| \leq M_{mc}^2 \\ 0, & \text{otherwise} \end{cases}$$

4. $T_{mc\_pred} \geq H_{mc\_pred}$ $$T_{mc\_pred} = \int_0^{h_{pred}} C_{mc\_ind\ 2}(\tau) d\tau, \text{ for } \tau \in 0 \sim h_{pred}$$

$$C_{mc\_ind\ 2}(\tau) = \begin{cases} w_{mc2}, & \text{if } |m_{mc}^{pred}(\tau)| > M_{mc}^4 \\ 1, & \text{if } M_{mc}^3 < |m_{mc}^{pred}(\tau)| \leq M_{mc}^4 \\ 0, & \text{otherwise} \end{cases}$$

When by design either $h_{proj} = 0$ or $h_{pred} = 0$, the corresponding condition #3 or #4 of the control condition II is removed from the AND logic.

When both the eDTW-B vehicle dynamic control is enabled and the DTC vehicle dynamic control is activated, it is beneficial to monitor whether the DTC is capable of handling the yaw control from the current time to a short time period to the future according to the current vehicle states and the vehicle states projected to the future. With reference to decision block 60, this is determined by control condition III as follows.

Control Condition III: DTC capability determination. First, future control yaw moment and vehicle state determination is performed. If the eDWT-B vehicle dynamic control is enabled, then $$m_c^{pred}(\tau)=m_{sc}^{pred}(\tau) \text{ and } \phi_{veh}(\tau)=\phi_{veh}^{sc}(\tau)$$

else $$m_c^{pred}(\tau)=m_{mc}^{pred}(\tau) \text{ and } \phi_{veh}(\tau)=\phi_{veh}^{mc}(\tau).$$

The future DTC yaw moment control potential is then computed as follows:

$$m_{DTC}^{+/-}(\tau)=f_{DTC}(\phi_{veh}(0),\phi_{veh}(\tau)), \tau\in 0\sim h_{DTC},$$

where $m_{sc}^{+/-}(\tau)$ is a pair of values representing the estimated positive and negative maximal achievable yaw control moment by DTC, and $$T_{DTC} \geq H_{DTC}$$

$$T_{DTC} = \int_0^{h_{DTC}} C_{DTC\_ind}(\tau) d\tau, \text{ for } \tau \in 0 \sim h_{DTC}$$

$$C_{DTC\_ind}(\tau) = \begin{cases} 1, & \text{if } \frac{m_c^{proj}(\tau)}{m_{DTC}^{+/-}(\tau)} \leq 1 \\ 0, & \text{otherwise} \end{cases}$$

where the positive value or the negative value of $m_{sc}^{+/-}(\tau)$ is used the same as the sign of $m_c^{pred}(\tau)$.

When $h_{DTC}=0$, only instantaneous DTC yaw moment control capacity is calculated.

With reference to decision block 62, when it has determined that the DTC vehicle dynamic control is insufficient of handling the control event, the activation of the eDWT-B vehicle dynamic control further depends on the following control condition IV.

Control Condition IV: Maneuverability control criteria II is an AND logic of all of the following conditions:
1. $T_{mc\_pred} \geq H_{mc\_pred\_dtc}$, where $T_{mc\_pred}$ is calculated using $c_{mc\_ind\,2}$ with thresholds $M_{mc}^5$ and $M_{mc}^6$ replacing $M_{mc}^3$ and $M_{mc}^4$.
2. $T_{sc\_pred} \geq H_{sc\_pred}$, where $T_{sc\_pred}$ is calculated the same as in control condition I.

At the end of a successfully yaw control event, it is expected to resume normal vehicle system control state such that the control objective can focus more on fuel economy. With reference to decision block 64, the cancellation of the DTC vehicle dynamic control relies on the following control condition V.

Control Condition V: DTC Exiting Condition:
1. $|m_{mc}^{proj}(0)| > M_{mc}^7$
2. $T_{mc\_proj} < H_{mc\_proj\_out}$, where $T_{mc\_proj}$ is calculated using $c_{mc\_ind\,2}$ with thresholds $M_{mc}^8$ and $M_{mc}^9$ replacing $M_{mc}^3$ and $M_{mc}^4$.
3. $T_{mc\_pred} < H_{mc\_pred\_out}$, where $T_{mc\_pred}$ is calculated with respect to thresholds $M_{mc}^{10}$ and $M_{mc}^{11}$.

Similarly, a decision is made based on the current and future vehicle control requests to determine whether it is unnecessary to maintain the presence of the eDWT-B effort such that the following control effort can go back to DTC or normal mode for better fuel economy optimizations. With reference to decision block 66, the cancellation of the eDWT-B vehicle dynamic control relies on the following control condition VI.

Control Condition VI: eDWT-B Exiting Condition:
1. $|m_{sc}^{proj}(0)| > M_{sc}^5$
2. $T_{sc\_proj} < H_{sc\_proj\_out}$, where $T_{sc\_proj}$ is calculated using $c_{sc\_ind\,2}$ with thresholds $M_{sc}^6$ and $M_{sc}^7$
3. $T_{sc\_pred} < H_{sc\_pred\_out}$, where $T_{sc\_pred}$ is calculated with respect to thresholds $M_{mc}^8$ and $M_{mc}^9$.

As described, an e-VDC control arbitration strategy has been proposed aiming to coordinate the vehicle dynamic controls, especially the wheel torque distribution related vehicle system control and vehicle dynamic control functions. The control strategy is able to adjust the control optimization criteria in different driving situations with adaptive prioritizing among requirements: stability, drivability, maneuverability, and fuel economy according to design specifications. Furthermore, the control strategy can achieve a smooth control coordination and synchronization between the two electric/hybrid vehicle dynamic control functions (i.e., DTC and eDTW-B vehicle dynamic controls) such that the overall vehicle handling performance is optimized continuously across a variety driving scenarios. Benefits of the control strategy may include (1) improved vehicle dynamic control performance with respect to safety, agility, traction, and comfort and (2) minimize compromise to fuel economy objective while achieving the first benefit.

As described, the control strategy includes the following features: control and coordination to synchronize e-VDC and VSC control in achieving enhanced vehicle dynamic control performance and improved fuel economy objective; control and coordination to arbitrate activation of the two e-VDC functions (DTC and eDTW-B) in achieving a continuous and optimized vehicle dynamic control process; eDTW-B vehicle dynamic control enabling determination; DTC vehicle dynamic control activation determination; determining whether DTC is sufficient for yaw moment control; activating eDTW-B when DTC is inefficient for yaw moment control; DTC deactivation determination; and eDTW-B disenabling determination.

While exemplary embodiments are described above, it is not intended that these embodiments describe all possible forms of the present invention. Rather, the words used in the specification are words of description rather than limitation, and it is understood that various changes may be made without departing from the spirit and scope of the invention. Additionally, the features of various implementing embodiments may be combined to form further embodiments.

What is claimed is:

1. A system comprising:
   a dynamic traction control (DTC) sub-system configured to partition motor torque between two axles such that motor torque allocated to one axle is re-allocated to the other axle;
   a motor enhanced dynamic wheel torque control-by-brake (eDWT-B) sub-system configured to allocate braking torque to a wheel and counteracting motor torque to another wheel; and
   a controller configured to operate a vehicle with a weighted combination of DTC and eDWT-B processes in conjunction together.

2. The system of claim 1 wherein:
   the controller selects according to a vehicle criterion the combination of the DTC and eDWT-B processes to control a vehicle operation.

3. The system of claim 2 wherein:
   the controller selects the combination such that the DTC sub-system effects the vehicle operation more than the eDWT-B sub-system effects the vehicle operation as long as the vehicle criterion remains satisfied by the selected combination.

4. The system of claim 2 wherein:
the controller selects the combination such that the DTC sub-system effects the vehicle operation more than the eDWT-B sub-system effects the vehicle operation as long as the vehicle criterion remains satisfied by the selected combination.

5. The system of claim 2 wherein:
the controller selects the combination such that the eDWT-B sub-system effects the vehicle operation more than the DTC sub-system effects the vehicle operation when the vehicle criterion is vehicle stability having a higher priority than vehicle drivability.

6. The system of claim 2 wherein:
the controller selects the combination such that the DTC sub-system effects the vehicle operation more than the eDWT-B sub-system effects the vehicle operation when the vehicle criterion is vehicle drivability having a higher priority than vehicle stability.

7. A dual-axle driven electric vehicle comprising:
front and rear motors configured to supply propulsion torque to front and rear axles, respectively;
a braking system configured to supply braking torque individually to wheels of the axles;
a dynamic traction control (DTC) system configured to control the front and rear motors to partition propulsion torque between the front and rear axles such that motor torque allocated to one axle is re-allocated to the other axle;
an electric motor enhanced dynamic wheel torque control by brake (eDWT-B) system configured to control the braking system to allocate braking torque to a wheel of one of the front and rear axles and to control one of the front and rear motors to allocate counteracting motor torque to the one of the front and rear axles for another wheel of the one of the front and rear axles; and
a controller configured to select according to a vehicle criterion a weighted combination of DTC and eDWT-B processes in conjunction together respectively to be provided by the DTC and eDWT-B systems to control a vehicle operation.

8. The vehicle of claim 7 wherein:
the controller selects the combination such that the DTC system effects the vehicle operation more than the eDWT-B system effects the vehicle operation as long as the vehicle criterion remains satisfied by the selected combination.

9. The vehicle of claim 7 wherein:
the controller selects the combination such that the eDWT-B system effects the vehicle operation more than the DTC system effects the vehicle operation when the vehicle criterion is vehicle stability having a higher priority than vehicle drivability.

10. The vehicle of claim 7 wherein:
the controller selects the combination such that the DTC system effects the vehicle operation more than the eDWT-B system effects the vehicle operation when the vehicle criterion is vehicle drivability having a higher priority than vehicle stability.

11. The vehicle of claim 7 wherein:
the vehicle operation is a desired yaw control moment.

12. A method comprising:
selecting according to a vehicle criterion a weighted combination of a dynamic traction control (DTC) process, which partitions motor torque between front and rear axles of a vehicle such that motor torque allocated to one axle is re-allocated to the other axle, and an electric motor enhanced dynamic wheel torque control by brake (eDWT-B) process, which allocates braking torque from a braking system of the vehicle to a wheel of one of the front and rear axles and a counteracting motor torque to the one of the front and rear axles for another wheel of the one of the front and rear axles, to control a vehicle operation; and
controlling the front axle, the rear axle, and the braking system of the vehicle in accordance with a selected weighted combination of DTC and eDWT-B processes in conjunction together.

13. The method of claim 12 wherein:
the combination is selected such that the DTC process effects the vehicle operation more than the eDWT-B process effects the vehicle operation as long as the vehicle criterion remains satisfied by the selected combination.

14. The method of claim 12 wherein:
the combination is selected such that the eDWT-B process effects the vehicle operation more than the DTC process effects the vehicle operation when the vehicle criterion is vehicle stability having a higher priority than vehicle drivability.

15. The method of claim 12 wherein:
the combination is selected such that the DTC process effects the vehicle operation more than the eDWT-B process effects the vehicle operation when the vehicle criterion is vehicle drivability having a higher priority than vehicle stability.

16. The method of claim 12 wherein:
the vehicle operation is a desired yaw control moment.

* * * * *